(12) United States Patent
Jung et al.

(10) Patent No.: US 8,762,842 B2
(45) Date of Patent: Jun. 24, 2014

(54) INFORMATION STORAGE MEDIUM CONTAINING INTERACTIVE GRAPHICS STREAM FOR CHANGE OF AV DATA REPRODUCING STATE, AND REPRODUCING METHOD AND APPARATUS THEREOF

(75) Inventors: Kil-soo Jung, Hwaseong-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 10/923,017

(22) Filed: Aug. 23, 2004

(65) Prior Publication Data

US 2005/0177791 A1    Aug. 11, 2005

(30) Foreign Application Priority Data

Feb. 9, 2004 (KR) .................... 2004-8345

(51) Int. Cl.
    *G06F 3/00*        (2006.01)
(52) U.S. Cl.
    USPC ........... 715/716; 715/719; 715/723; 715/808; 715/791
(58) Field of Classification Search
    CPC .................. H04N 19/00545; H04N 19/00781; H04N 5/44513; H04N 5/45; H04N 5/76; H04N 5/781; H04N 9/8047; H04N 9/8216; H04N 21/458; H04N 21/4622; H04N 21/4782; H04N 21/812; H04N 5/4401; H04N 5/50; H04N 5/765; H04N 5/782
    USPC .................. 715/716, 719, 723, 808, 791, 727
    See application file for complete search history.

(56) References Cited

U.S. PATENT DOCUMENTS

| | | | | |
|---|---|---|---|---|
| 5,526,125 | A | * | 6/1996 | Mori et al. ...................... 386/52 |
| 5,689,618 | A | * | 11/1997 | Gasper et al. ................. 704/276 |
| 5,907,658 | A | | 5/1999 | Murase et al. |
| 5,930,446 | A | * | 7/1999 | Kanda ............................ 386/52 |
| 5,990,959 | A | | 11/1999 | Case |
| 5,995,115 | A | * | 11/1999 | Dickie ......................... 345/441 |
| 6,067,400 | A | | 5/2000 | Saeki et al. |
| 6,118,445 | A | | 9/2000 | Nonomura et al. |
| 6,181,871 | B1 | * | 1/2001 | Saeki et al. ..................... 386/95 |
| 6,246,401 | B1 | * | 6/2001 | Setogawa et al. ............. 715/723 |
| 6,246,402 | B1 | * | 6/2001 | Setogawa et al. ............. 715/723 |
| 6,324,336 | B1 | * | 11/2001 | Kanda ............................ 386/52 |

(Continued)

FOREIGN PATENT DOCUMENTS

| | | |
|---|---|---|
| CA | 2 528 509 A1 | 1/2005 |
| CA | 2 527 884 A1 | 2/2005 |

(Continued)

OTHER PUBLICATIONS

Gill et al.; Mobile Audio—Visual Terminal: System Design and Subjective Testing in DECT and UMTS Network; © 2000; IEEE; 14 pages.*

(Continued)

*Primary Examiner* — Linh K Pham
(74) *Attorney, Agent, or Firm* — NSIP Law

(57) ABSTRACT

A method of reproducing interactive graphics data including menu data, the method including receiving a reproduction command of the interactive graphics data during reproduction of AV data, and changing a reproducing state of the AV data.

11 Claims, 7 Drawing Sheets

(56) References Cited

U.S. PATENT DOCUMENTS

| | | | |
|---|---|---|---|
| 6,366,732 B1 | 4/2002 | Murase et al. | |
| 6,389,221 B1* | 5/2002 | Saeki et al. | 386/95 |
| 6,411,771 B1* | 6/2002 | Aotake | 386/52 |
| 6,453,459 B1* | 9/2002 | Brodersen et al. | 717/100 |
| 6,510,278 B1* | 1/2003 | Takayama | 386/52 |
| 6,580,870 B1 | 6/2003 | Kanazawa et al. | |
| 6,640,046 B2 | 10/2003 | Moon | |
| 6,654,031 B1* | 11/2003 | Ito et al. | 715/723 |
| 6,701,064 B1 | 3/2004 | De Haan et al. | |
| 6,963,910 B1* | 11/2005 | Belknap et al. | 709/223 |
| 7,346,270 B2* | 3/2008 | Yoshio et al. | 386/248 |
| 7,362,956 B2* | 4/2008 | Akita et al. | 386/96 |
| 7,398,004 B1* | 7/2008 | Maffezzoni et al. | 386/282 |
| 7,433,580 B1* | 10/2008 | Terashita et al. | 386/95 |
| 8,411,975 B2 | 4/2013 | Lee et al. | |
| 8,437,601 B2 | 5/2013 | Park et al. | |
| 8,463,107 B2* | 6/2013 | Ikeda et al. | 386/248 |
| 8,538,248 B2 | 9/2013 | Kang et al. | |
| 2001/0005442 A1* | 6/2001 | Ueda et al. | 386/46 |
| 2001/0008575 A1* | 7/2001 | Rho et al. | 386/69 |
| 2001/0041049 A1* | 11/2001 | Kanda | 386/52 |
| 2001/0051040 A1* | 12/2001 | Yoshio et al. | 386/98 |
| 2002/0031327 A1* | 3/2002 | Watanabe et al. | 386/46 |
| 2002/0061186 A1* | 5/2002 | Nonomura et al. | 386/95 |
| 2002/0078456 A1 | 6/2002 | Hudson et al. | |
| 2002/0122657 A1* | 9/2002 | Moon et al. | 386/94 |
| 2002/0127001 A1* | 9/2002 | Gunji et al. | 386/124 |
| 2002/0194618 A1* | 12/2002 | Okada et al. | 725/132 |
| 2003/0115384 A1* | 6/2003 | Sonehara et al. | 710/10 |
| 2003/0131357 A1* | 7/2003 | Kim | 725/60 |
| 2003/0161615 A1 | 8/2003 | Tsumagari et al. | |
| 2003/0177024 A1* | 9/2003 | Tsuchida et al. | 705/1 |
| 2003/0182627 A1 | 9/2003 | Chung et al. | |
| 2003/0220973 A1 | 11/2003 | Zhu et al. | |
| 2003/0236836 A1* | 12/2003 | Borthwick | 709/204 |
| 2004/0001706 A1* | 1/2004 | Jung et al. | 386/125 |
| 2004/0042763 A1* | 3/2004 | Morita et al. | 386/46 |
| 2004/0047588 A1* | 3/2004 | Okada et al. | 386/46 |
| 2004/0047619 A1* | 3/2004 | Fujiwara | 386/126 |
| 2004/0062530 A1* | 4/2004 | Tsumagari et al. | 386/125 |
| 2004/0096191 A1 | 5/2004 | Seo et al. | |
| 2004/0141070 A1* | 7/2004 | Chiku et al. | 348/231.99 |
| 2004/0146283 A1 | 7/2004 | Seo et al. | |
| 2004/0184779 A1* | 9/2004 | Moon et al. | 386/95 |
| 2005/0002650 A1 | 1/2005 | Seo et al. | |
| 2005/0015508 A1 | 1/2005 | Hankejh et al. | |
| 2005/0025452 A1 | 2/2005 | Seo et al. | |
| 2005/0108773 A1 | 5/2005 | Jung et al. | |
| 2005/0177863 A1 | 8/2005 | Jung et al. | |
| 2006/0007963 A1 | 1/2006 | Kang et al. | |
| 2006/0153532 A1 | 7/2006 | McCrossan et al. | |
| 2006/0165388 A1 | 7/2006 | Uesaka et al. | |
| 2006/0188223 A1* | 8/2006 | Ikeda et al. | 386/95 |
| 2006/0291810 A1 | 12/2006 | McCrossan et al. | |
| 2007/0071412 A1 | 3/2007 | Yoo et al. | |
| 2008/0163106 A1 | 7/2008 | Jung et al. | |

FOREIGN PATENT DOCUMENTS

| | | |
|---|---|---|
| CA | 2 551 695 A1 | 7/2005 |
| CN | 101072312 A | 11/2007 |
| CN | 101072313 A | 11/2007 |
| EP | 1175087 A2 | 1/2002 |
| EP | 0 947 105 B1 | 2/2003 |
| EP | 1605696 A1 * | 12/2005 |
| JP | 10-199215 A | 7/1998 |
| JP | 2001-118321 | 4/2001 |
| JP | 2001-142511 A | 5/2001 |
| JP | 2001-245247 A | 9/2001 |
| JP | 2001-326829 | 11/2001 |
| JP | 2002-230832 A | 8/2002 |
| JP | 2002-238032 A | 8/2002 |
| JP | 2002-251840 A | 9/2002 |
| JP | 2003-23596 A | 1/2003 |
| JP | 2003-110992 A | 4/2003 |
| JP | 2003-249057 A | 9/2003 |
| JP | 2004-007518 A | 1/2004 |
| JP | 2004-030557 A | 1/2004 |
| JP | 2005-117660 A | 4/2005 |
| JP | 2005-204315 A | 7/2005 |
| JP | 2005-354706 A | 12/2005 |
| JP | 2006-169548 * | 6/2006 |
| JP | 2007-087577 A | 4/2007 |
| KR | 2002-0015232 A | 2/2002 |
| KR | 10-0387125 B1 | 5/2003 |
| KR | 10-2004-0078155 A | 9/2004 |
| KR | 10-2005-0080275 | 8/2005 |
| KR | 10-2005-0117462 A | 12/2005 |
| RU | 2095857 C1 | 11/1997 |
| RU | 2000123689 A | 11/1999 |
| RU | 2 214 066 C2 | 10/2003 |
| RU | 2 214 632 C2 | 10/2003 |
| TW | 550507 | 9/2003 |
| TW | I280565 B | 5/2007 |
| TW | I280566 B | 5/2007 |
| WO | WO 03/032634 | 4/2003 |
| WO | WO 2006/009533 A1 | 1/2006 |

OTHER PUBLICATIONS

The First Office Action issued Jul. 20, 2007 by the State Intellectual Property Office of the People's Republic of China re: Chinese Application No. 2005100076285 (16 pp).
Office Action issued in corresponding Taiwanese Patent Application No. 094103183 dated Jul. 18, 2008.
Japanese Office Action issued on Jan. 12, 2012, in corresponding Japanese Application No. 2005-028086 (2 pages).
European Search Report issued on Aug. 11, 2010, in corresponding European Patent Application No. 05250733.2 (3 pages).
Japanese Office Action issued Nov. 8, 2011, in counterpart Japanese Application No. 2010-091822 (4 Pages, including English translation.
Japanese Office Action issued Nov. 8, 2011, in counterpart Japanese Application No. 2010-091823 (3 Pages, including English translation).
Extended European Search Report issued on Jun. 7, 2011, in counterpart European Patent Application No. 11162440.9 (6 pages, in English).
European Examination Report issued May 22, 2012 in counterpart European Patent Application No. 11162440.9 (5 pages, in English).
Russian Office Action issued May 26, 2006 in counterpart Russian Application No. 2005103274 (19 pages, in Russian, including complete English translation).
Malaysian Preliminary Examination, Search, and Substantive Examination Reports issued Apr. 30, 2008 in counterpart Malaysian Application No. PI20050449 (4 pages, in English).
Japanese Final Rejection issued Jul. 16, 2013 in counterpart Japanese Application No. 2010-091822 (4 pages, in Japanese, including English translation).
Chinese Office Action issued Mar. 6, 2012 in counterpart Chinese Patent Application No. 200710108926.2 (9 pages with English language translation).
European Examination Report issued May 3, 2012 in counterpart European Patent Application No. 05250733.2 (5 pages in English).
"Almighty Multimedia Player—JetAudio3.12", Wenchuang Chen, Multimedia World, Issue 5, 1998 (5 pages with English language translation).
Chinese Sixth Office Action mailed Sep. 13, 2012, issued in counterpart Chinese Patent Application No. 200710108926.2; 6 pages including English translation.
Japanese Non-Final Rejection mailed Oct. 16, 2012, issued in counterpart Japanese Patent Application No. 2010-091822; 5 pages including English translation.
Japanese Non-Final Rejection mailed Oct. 16, 2012, issued in counterpart Japanese Patent Application No. 2010-091823; 5 pages including English translation.
Office Action issued on Oct. 31, 2008 in Chinese Patent Application No. 200710108926.2.

* cited by examiner

INFORMATION STORAGE MEDIUM CONTAINING INTERACTIVE GRAPHICS STREAM FOR CHANGE OF AV DATA REPRODUCING STATE, AND REPRODUCING METHOD AND APPARATUS THEREOF

CROSS-REFERENCE TO RELATED APPLICATIONS

This application claims the priority of Korean Patent Application No. 2004-8345, filed on Feb. 9, 2004, in the Korean Intellectual Property Office, the disclosure of which is incorporated herein in its entirety by reference.

BACKGROUND OF THE INVENTION

1. Field of the Invention

The present invention relates to reproducing audio/video (AV) data, and, more particularly, to an information storage medium containing interactive graphics streams capable of changing the reproducing state of AV data, and a reproducing method and apparatus that use the interactive graphics streams capable of changing the reproducing state of AV data.

2. Description of the Related Art

FIG. 1 is a diagram showing a variety of streams being multiplexed into a main stream.

Referring to FIG. 1, a main stream 110 of multimedia pictures is formed by multiplexing a video stream 102, an audio stream 104, a presentation graphics stream 106 to provide subtitles, and an interactive graphics stream 108 to provide a menu containing buttons for interaction with a user. The interactive graphics stream 108 includes a plurality of segments.

FIG. 2 is a diagram showing the structure of a display set included in the interactive graphics stream 108.

Referring to FIG. 2, the interactive graphics stream 108 is formed with a plurality of display sets, each of which includes a plurality of segments. Each of the segments forming the display set will now be explained. An interactive composition segment (ICS) 210 defines display information of an "interactive display" in the interactive graphics stream 108. The "interactive display" is used to provide graphics elements such as a button corresponding to a command. A palette definition segment (PDS) 220 is used to define a palette which provides output colors or degrees of transparency that should be applied to pixel values in a graphics plane in relation to the interactive graphics stream 108. There can be a plurality of object definition segments (ODS) 230-1 through 230-n, which are actual graphics data in the interactive graphics stream 108. An end segment 240 is used to indicate the end of a display set.

This interactive graphics stream 108 is reproduced together with an AV stream. When a menu is displayed on the screen, in order to navigate the menu while the AV stream is being reproduced, the reproduction of AV data continues even during reproduction of the interactive graphics stream corresponding to the menu. Accordingly, some scenes of a movie may be missed during menu navigation, or if the menu box takes up a large part of the screen, important scenes may be missed.

SUMMARY OF THE INVENTION

The present invention provides an information storage medium containing an interactive graphics stream capable of changing the reproducing state of AV data when menu navigation is performed, and a reproducing method and apparatus using the medium.

Additional aspects and/or advantages of the invention will be set forth in part in the description which follows and, in part, will be obvious from the description, or may be learned by practice of the invention.

According to an aspect of the present invention, there is provided an information storage medium including: AV data; presentation graphics data including subtitle information corresponding to the AV data; and interactive graphics data including menu data, wherein the interactive graphics data further includes a reproducing state change navigation command to change the reproducing state of the AV data and/or the presentation graphics data.

The interactive graphics data may include at least one display set formed with a plurality of segments, the segments may include an interactive composition segment including composition information of the menu data, and the interactive composition segment may include the reproducing state change navigation command. The reproducing state change navigation command may be executed before the menu is displayed.

A user command corresponding to the interactive graphics data may control the reproducing state of the AV data and/or the presentation graphics data.

According to another aspect of the present invention, there is provided a method of reproducing interactive graphics data including menu data, the method comprising: receiving a reproduction command of the interactive graphics data during reproduction of AV data; and changing a reproducing state of the AV data.

A reproducing state change navigation command, which may be included in the interactive graphics data, to change the reproducing state of the AV data may be performed before changing the reproducing state of the AV data. The reproducing state change navigation command may be a command to change the reproducing state of the AV data to a "Still" state.

According to still another aspect of the present invention, there is provided a reproducing apparatus comprising: an object buffer to receive interactive graphics data comprising menu data; and a graphics controller to control the reproducing state of the received interactive graphics data, wherein the interactive graphics data includes a reproducing state change navigation command to change the reproducing state of the AV data and/or presentation graphics data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
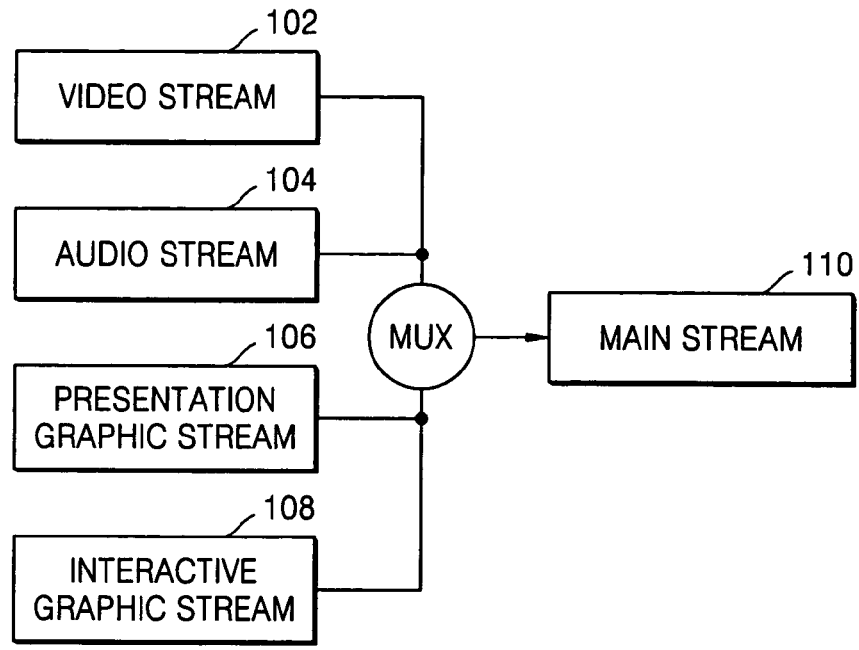
FIG. 1 is a diagram showing a variety of streams being multiplexed into a main stream.
Figure 2:
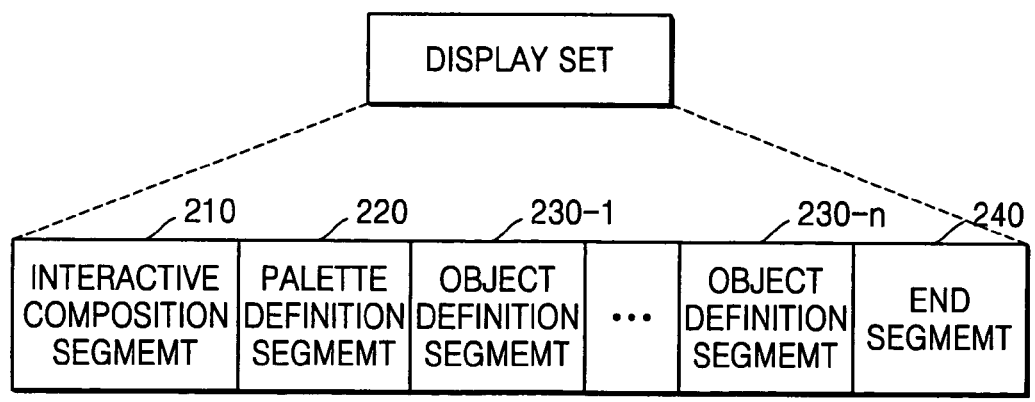
FIG. 2 is a diagram showing the structure of a display set in an interactive graphics stream.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
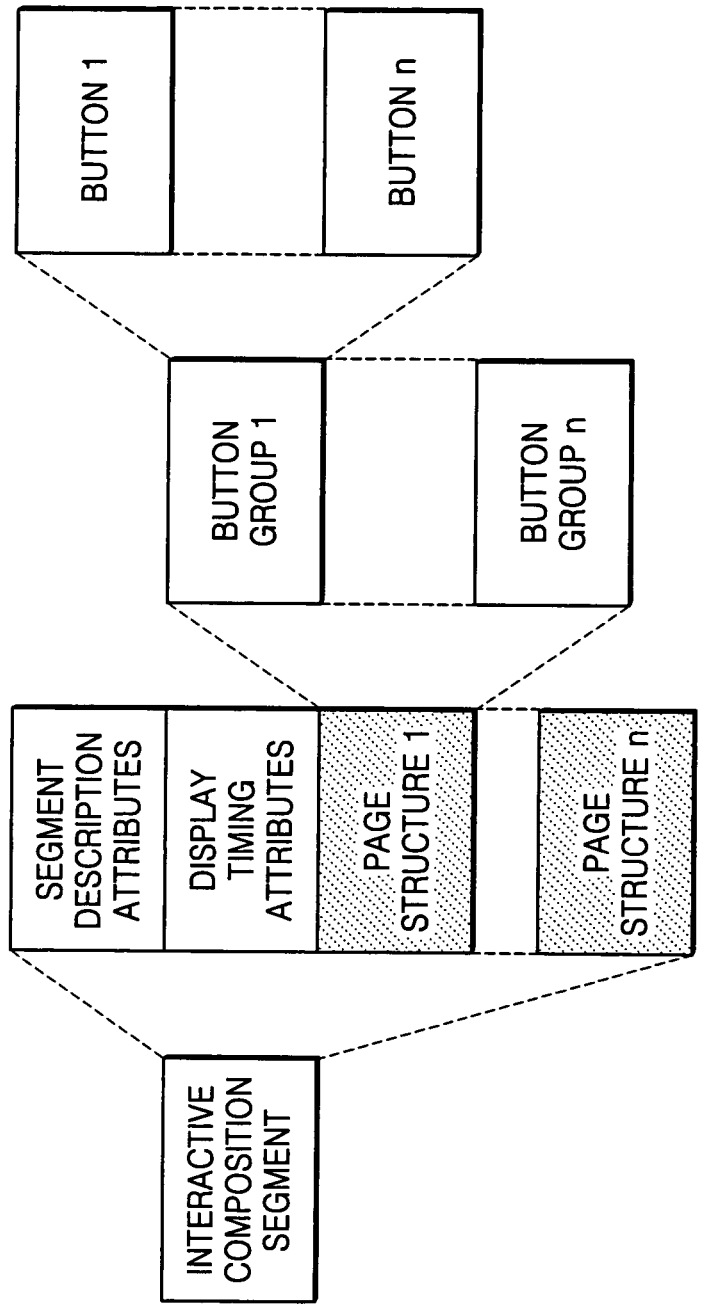
FIG. 3 is a diagram showing the structure of an interactive composition segment (ICS) in an interactive graphics stream, which is designed to implement a menu.

Referring to FIG. 3, an interactive composition segment (ICS) includes a plurality of page structures. The ICS is designed to implement a plurality of menu pages, or other forms of a graphical user interface, within a valid display period of a display set to which the ICS belongs. A page is a group of buttons forming one menu, which is distinguished from other pages by a page_id. That is, one ICS includes a plurality of pages. Both a pop-up menu and an always-on menu have identical ICS structures, and an attribute indicating that a menu implemented by the ICS is a pop-up menu or an always-on menu is written in segment description attributes.

Figure 4:
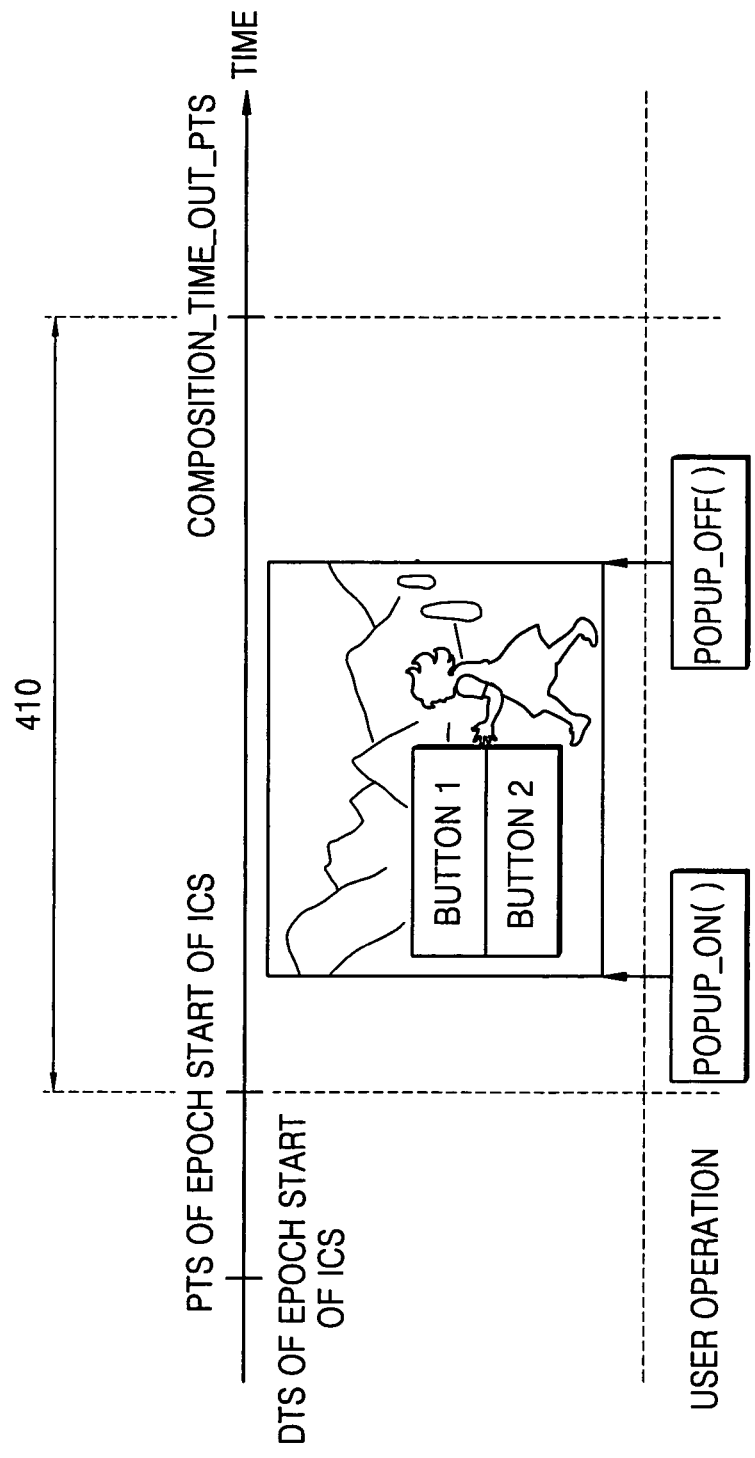
FIG. 4 is a diagram illustrating a valid display period of a pop-up menu.

FIG. 4 is a diagram illustrating a valid display period of a pop-up menu.

The pop-up menu is not displayed on the screen even when the time point at which AV data is reproduced reaches the presentation time stamp (PTS) of Epoch Start of ICS (start of new epoch of ICS), and the pop-up menu is only displayed on the screen when a button to which a user operation is allocated, such as "PopUp_on( )" for a user to select to display the menu, is selected. The term "epoch" will be explained later. The menu disappears in response to a user operation such as "PopUp_off( )" or at a time point of composition_time_out_pts of the ICS. The term composition_time_out_pts describes the end time of the interactive display in an epoch. At the end time, the interactive display is no longer valid and consequently shall no longer be displayed. Accordingly, the interval indicated by reference number 410, from the PTS time point of the ICS to the time point of composition_time_out_pts, is the valid display period of the pop-up menu, and the time a menu screen is actually displayed on the screen, between PopUp_on( ) and PopUp_off( ) within the valid display period, is an interactive display period.

Here, the interactive display period is a valid interval in which the pop-up menu can be displayed, that is, an interval where user operations of PopUp_on( ) and PopUp_off( ) by the user can be applied. The interactive display period is an interval in which the menu is actually displayed on the screen.

The interactive graphics data stream is formed with one or more units, each referred to as an epoch, considering the operation model of an interactive graphics decoder. All interactive graphics objects in an epoch period are decoded and stored continuously in an object buffer in an interactive graphics decoder.

That is, in one epoch period, repeated use of decoded interactive graphics objects is possible. Accordingly, unless the next epoch data are input, the data are continuously maintained in the decoder, and at the moment when the current epoch ends and the next epoch begins, all buffers in the decoder are reset and all data stored in the object buffers disappears.

Each segment in one display set is written in a packetized elementary stream (PES), which is a packet unit of an MPEG-2 transport stream. Here, decoding of the display set is performed for a period corresponding to the decoding time stamp (DTS) time contained in the PES packet, and output of the packets on the screen begins at the PTS time. The output completion time of the display set is determined by a value in the composition_time_out_pts field recorded in the ICS.

Figure 5:
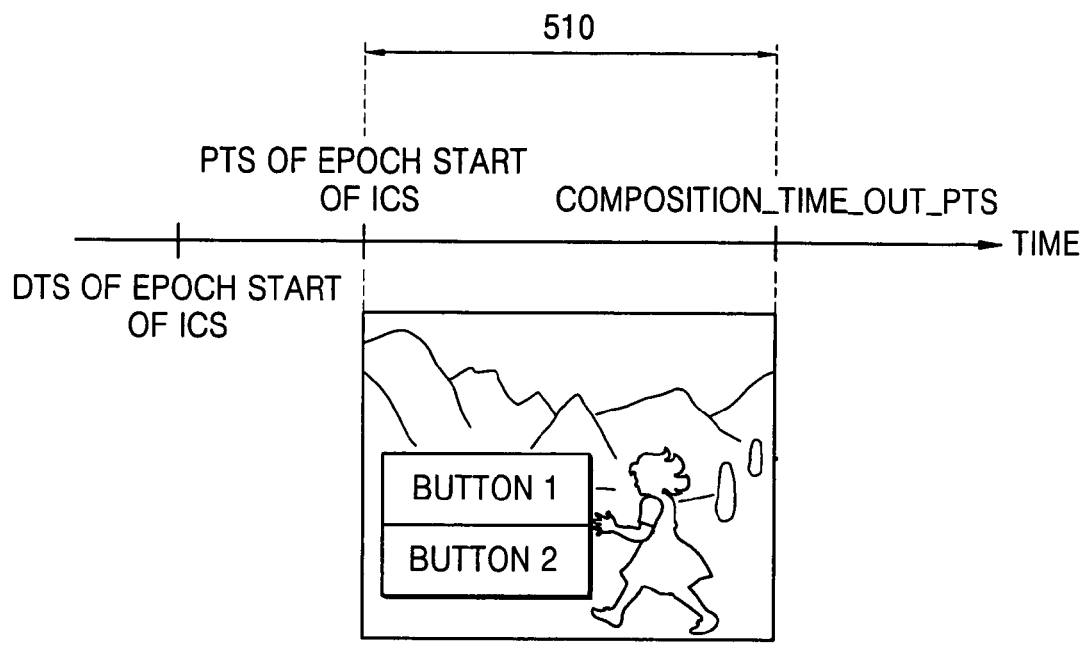
FIG. 5 is a diagram illustrating a valid display period of an always-on menu.

FIG. 5 is a diagram illustrating a valid display period of an always-on menu.

When the reproducing time point of AV data becomes the PTS of Epoch Start of ICS, the first page of the always-on menu is displayed on the screen, and at the time point of composition_time_out_pts of the ICS, the always-on menu disappears automatically. Accordingly, the interval indicated by reference number 510, from the PTS time point of the ICS and to the time point of composition_time_out_pts, is the valid display period of the always-on menu, and the valid display period is the same as the interactive display period when the menu is actually displayed on the screen.

As described above with reference to FIGS. 4 and 5, there is a difference between the pop-up menu and the always-on menu in that the pop-up menu is displayed on the screen within a valid display period in an epoch set by a user operation, while the always-on menu is displayed automatically at the PTS time point of the ICS. Each of these menus is displayed together with reproduction of AV data. Usually, even when a menu is displayed, the reproduction of AV data continues. Accordingly, a menu box is displayed during reproduction of AV data, and if a user performs menu navigation during reproduction of AV data, the scenes cannot be viewed correctly because of the part hidden by the menu box, or movie scenes that are playing during the menu navigation can be missed.

Figure 6:
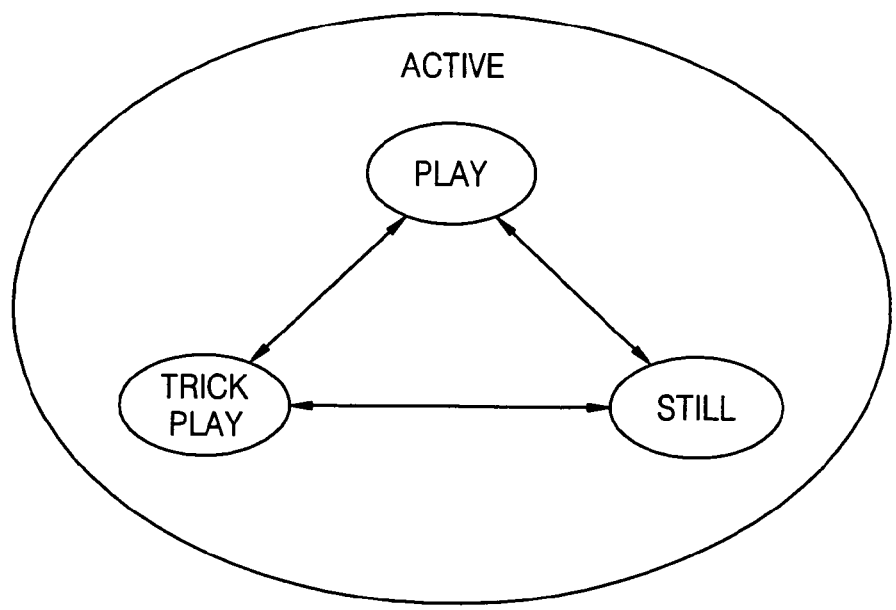
FIG. 6 is a diagram showing states that an AV presentation can have when a presentation engine is active.

FIG. 6 is a diagram showing states that an AV presentation can have when a presentation engine is active.

Referring to FIG. 6, in AV presentation, there are states such as "Play", "Trick Play", and "Still". "Play" indicates a state where reproduction is performed at a normal speed, that is, ×1.0 (speed multiplied by 1), and "Trick Play" indicates a state where reproduction is performed at a lower or higher speed than the ×1.0 speed. "Still" indicates that a last scene is continuously displayed on the screen and reproduction is performed at a speed of ×0. Accordingly, in the "Still" state, reproduction of video and audio data is temporarily stopped but the navigation system operates continuously. The "Still" state is different from a "Pause" state. In a "Pause" state, all operations, including the operations of the navigation system, stop.

Accordingly, in the present invention, a navigation command "Still", enabling a user to change the state of AV presentation from "Play" to "Still", is defined such that when a menu is displayed during reproduction of AV data, the user does not miss movie scenes. That is, according to the intention of a content manufacturer, the "Still" navigation command is made to be used so that when a menu is reproduced, reproduction of AV data can be temporarily stopped.

Figure 7:
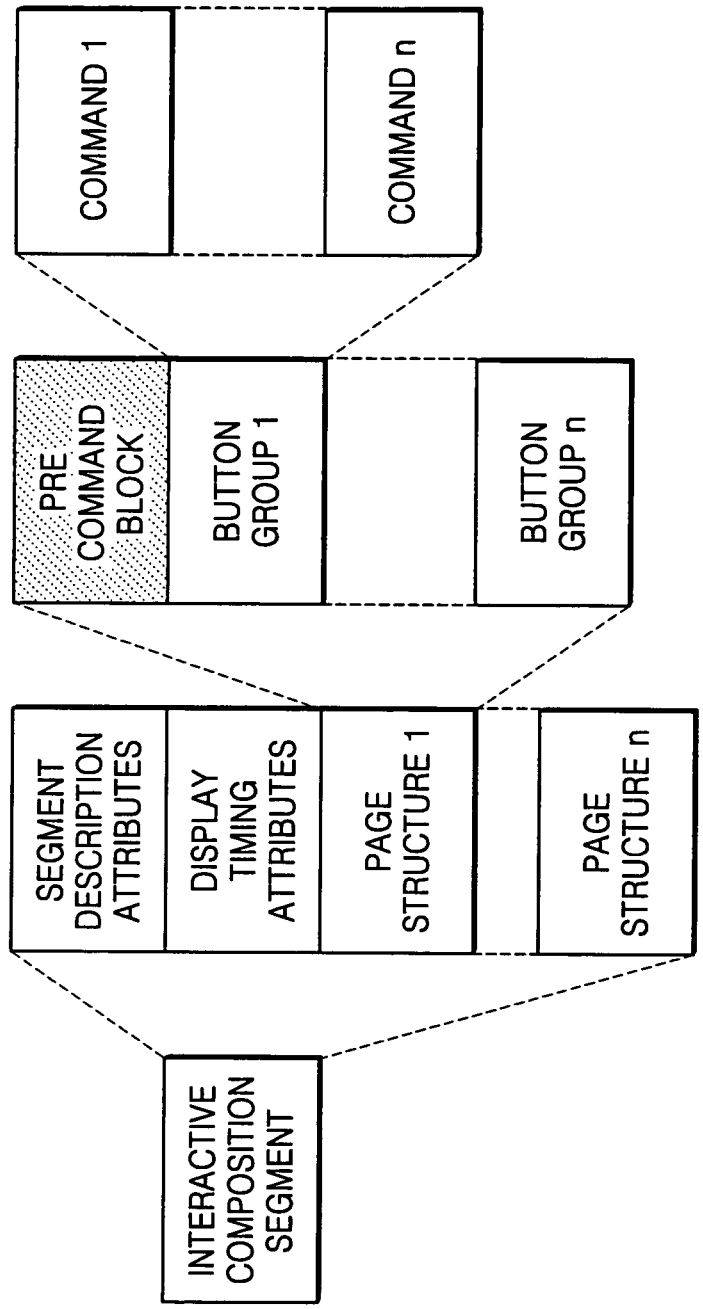
FIG. 7 is a diagram showing the structure of an ICS to which a pre-command block is added, according to an embodiment of the present invention that implements a temporary stop function. The pre-command block is added when a pop-up menu is prepared so that the reproducing state of AV data can be controlled.

FIG. 7 is a diagram showing the structure of an ICS to which a pre-command block is added, according to an embodiment of the present invention which implements a temporary stop function. The pre-command block is added when a pop-up menu is prepared so that the reproducing state of AV data can be controlled.

Referring to FIG. 7, it can be seen that a pre-command block is added to a page structure data area. The pre-command block contains navigation commands that should be executed before the page structure data containing the pre-command block are displayed on the screen. If a manufacturer wants the reproduction of AV data to be continued when a pop-up menu page defined by the ICS is executed by a user, the manufacturer can choose not to include a "Still" command in the pre-command block. Also, if the designer wants the reproduction of AV data to stop temporarily, the manufacturer can include a "Still" command in the pre-command block so that reproduction of AV data can be temporarily stopped before the menu page is displayed.

Figure 8:
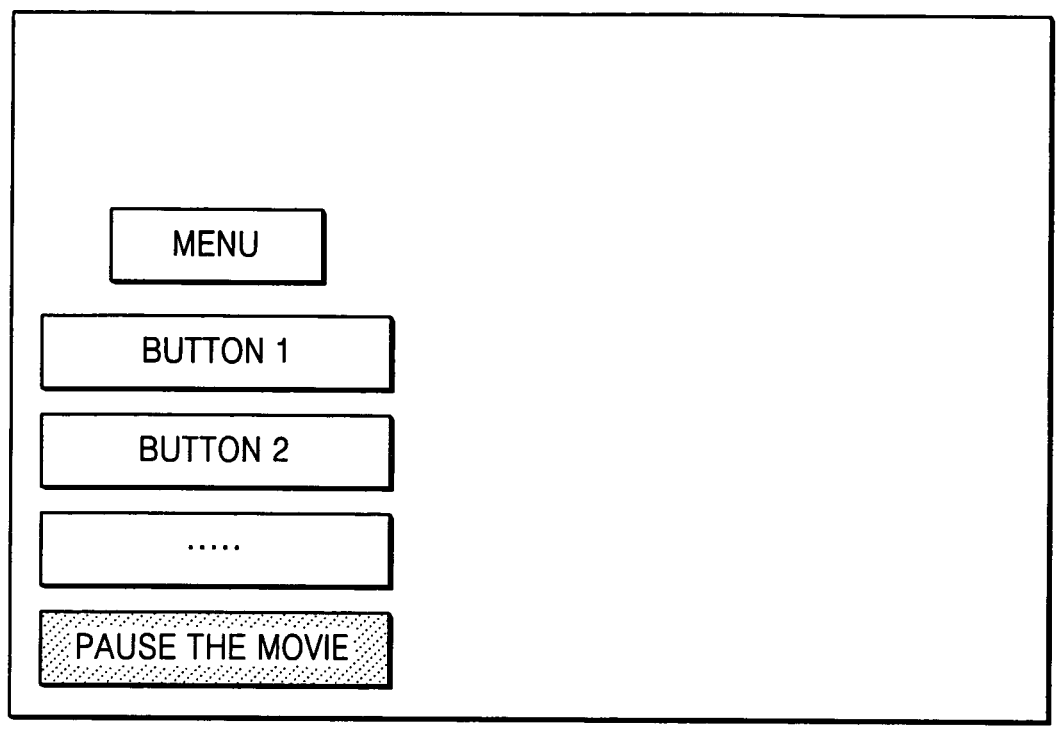
FIG. 8 is a diagram showing the structure of an ICS to which a "Still" command is allocated in a menu screen, according to another embodiment of the present invention that implements a temporary stop function.

FIG. 8 is a diagram showing the structure of an ICS to which a "Still" command is allocated in a menu screen, according to another embodiment of the present invention that implements a temporary stop function.

Referring to FIG. 8, in this embodiment, a manufacturer can provide a menu screen to display on the screen in which a "Still" command is allocated to a predetermined button, such that according to user selection, the reproducing state of AV can be changed to a temporary stop state.

As described above, by using the "Still" navigation command changing the state of AV presentation from "Play" to "Still", when a pop-up menu or an always-on menu is executed, the reproducing state of AV data can be controlled according to the intention of the manufacturer.

Figure 9:
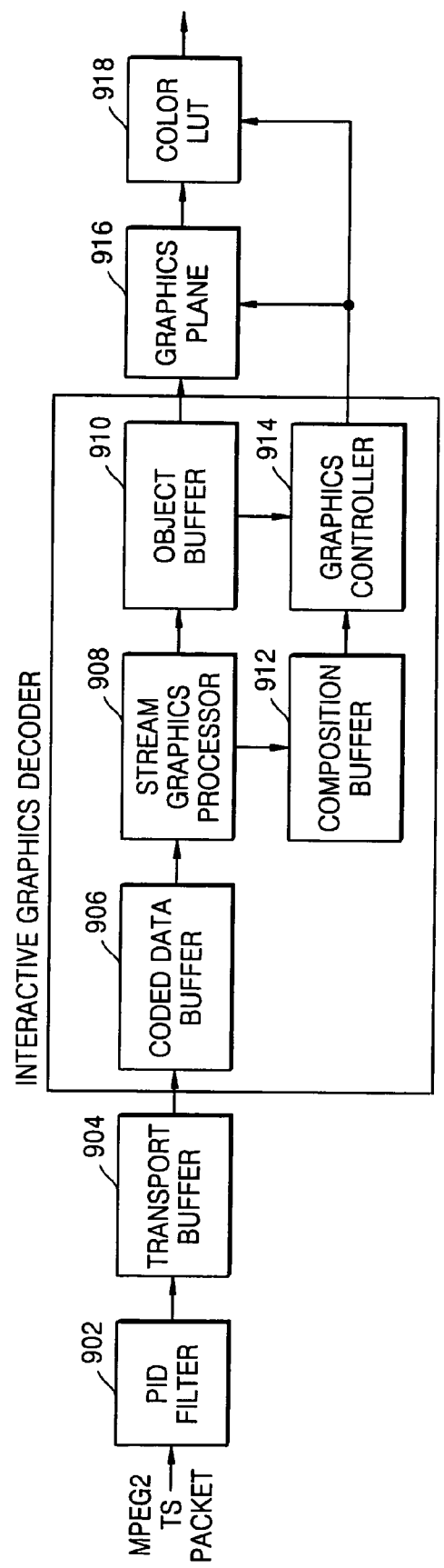
FIG. 9 is a diagram showing a reproducing apparatus according to an embodiment of the present invention which reproduces an interactive graphics stream.

FIG. 9 is a diagram showing a reproducing apparatus according to an embodiment of the present invention that reproduces an interactive graphics stream.

Referring to FIG. 9, a block diagram of an interactive graphics decoder of a reproducing apparatus according to an embodiment of the present invention is provided. In an MPEG-2 TS packet, which is a main stream read out from a storage medium, only an interactive graphics stream is selectively taken and transferred to a transport buffer 904, and then transmitted to an interactive graphics decoder. In a coded data buffer 906, data to be decoded is stored. In a stream graphics processor 908, the data is decoded and object data for button images is transmitted to an object buffer 910, and composition information is transmitted to a composition buffer 912 such that screen output of the interactive graphics stream is controlled.

Upon reaching the PTS time, corresponding to the start of screen output of the interactive graphics stream, the composition buffer 912 controls a graphics controller 914 such that images to be output on the current screen are determined and transmitted from the object buffer 910 to a graphics plane 916, and color information is transmitted to a color look-up table 918 to form an interactive graphics stream on the screen. Also, the graphics controller 914 receives an input from the user and changes the button state in response to position movement of or selection of a button, and indicates the result on the screen output.

Meanwhile, the embodiments of the interactive graphics stream reproduction method described above can be written as a computer program. Codes and code segments forming the programs can be easily inferred by a computer programmer in the field. The program may be stored in an information storage medium, and read and executed by a computer such that the method is implemented. Examples of the information storage medium include magnetic storage media, optical recording media, and storage media such as carrier waves.

The embodiments presented in this description should be considered in a descriptive sense only, and not for purposes of limitation. Therefore, the scope of the invention is defined not by the detailed description of the invention but by the appended claims, and all differences within the scope will be construed as being included in the present invention.

According to the present invention as described above, the method capable of controlling the state of AV presentation, that is, the state of a presentation engine, when a pop-up menu or an always-on menu is displayed, is provided. Accordingly, the present invention enables a manufacturer or a user to maintain or temporarily stop the reproduction of AV data when a menu is reproduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reproducing interactive graphics data, the method comprising:

reproducing the interactive graphics data during reproduction of video data using a first command, the interactive graphics data including an interactive composition segment to implement at least one pop-up menu page, and the at least one pop-up menu page including at least one button containing at least one of navigation command; and changing a reproducing state of the video data in response to a predetermined navigation command among the at least one of navigation command contained in a predetermined button among the at least one button included in the pop-up menu page when the predetermined button is activated by a user;

wherein the changed reproducing state of the video data is a still state when the predetermined navigation command is a command to change the reproducing state of the video data to a still state, wherein the still state indicates that a last scene of the video data is continuously displayed and the navigation function operates continuously.

2. The method of claim 1, wherein a reproducing state change navigation command, included in the interactive composition segment, is performed to change the reproducing state of the video data before changing the reproducing state of the video data in response to the predetermined navigation command.

3. The method of claim 2, wherein one of the at least one pop-up menu pages includes the reproducing state change navigation command.

4. The method of claim 1, wherein the changing the reproducing state of the video data includes displaying menu data containing a user interaction command to change the reproducing state of the video data.

5. The method of claim 4, wherein the user interaction command changes the reproducing state of the video data to a Still state.

6. The method of claim 1, wherein the first command to reproduce the interactive graphics data is received from a user.

7. The method of claim 1, wherein the first command to reproduce the interactive graphics data is an always-on command received when a reproducing time point of the video data becomes a presentation time stamp of an epoch start in the interactive composition segment.

8. The method of claim 1, wherein the at least one pop-up menu page is displayed to cover at least a portion of the reproduced video data.

9. The method of claim 1, wherein the at least one pop-up menu page is displayed for a valid display period according to time stamp points included in the interactive composition segment.

10. A method of reproducing interactive graphics data, the method comprising:

- displaying the interactive graphics data while reproducing video data, the interactive graphics data comprising data corresponding to a pop-up graphical user interface to be used in user interaction; and
- changing a reproducing state of the video data upon the displaying of the interactive graphics data, the changing of the reproducing state of the video data also being executable by receiving a command through the graphical user interface,
- wherein the changed reproducing state of the video data is a still state when the command is a command to change the reproducing state of the video data to a still state,
- wherein the still state indicates that a last scene of the video data is continuously displayed and the navigation function operates continuously.

11. The method of claim 7, wherein the interactive graphics data is reproduced only during a valid display period.

* * * * *